United States Patent
Swensen et al.

(10) Patent No.: US 7,715,838 B2
(45) Date of Patent: May 11, 2010

(54) AIRCRAFT BASED CELLULAR SYSTEM

(75) Inventors: Marvin D. Swensen, Fullerton, CA (US); John G. Himes, Placentia, CA (US)

(73) Assignee: The Boeing Company, Chicago, IL (US)

(*) Notice: Subject to any disclaimer, the term of this patent is extended or adjusted under 35 U.S.C. 154(b) by 1183 days.

(21) Appl. No.: 10/405,280

(22) Filed: Apr. 2, 2003

(65) Prior Publication Data
US 2004/0198346 A1    Oct. 7, 2004

(51) Int. Cl.
*H04W 40/00* (2009.01)
(52) U.S. Cl. ............... 455/428; 455/430; 455/431; 455/13.1; 342/354; 370/316; 244/158.1
(58) Field of Classification Search ......... 455/427–431, 455/12.1, 13.1, 436–437, 445, 11.1; 370/316, 370/352; 342/354; 343/702; 244/158.1
See application file for complete search history.

(56) References Cited

U.S. PATENT DOCUMENTS

| | | | |
|---|---|---|---|
| 3,742,358 A | 6/1973 | Cesaro | |
| 4,476,576 A | 10/1984 | Wheeler et al. | |
| 4,704,732 A | 11/1987 | Csonka | |
| 4,903,036 A | 2/1990 | Wheeler | |
| 5,104,059 A | 4/1992 | Rand et al. | |
| 5,408,515 A * | 4/1995 | Bhagat et al. | 455/431 |
| 5,438,610 A | 8/1995 | Bhagat et al. | |
| 5,555,257 A * | 9/1996 | Dent | 370/319 |
| 5,651,050 A | 7/1997 | Bhagat et al. | |
| 5,722,042 A | 2/1998 | Kimura et al. | |
| 5,903,549 A * | 5/1999 | von der Embse et al. | 370/310 |
| 5,918,157 A * | 6/1999 | Wiedeman et al. | 455/13.1 |
| 5,949,766 A | 9/1999 | Ibanez-Meier et al. | |
| 5,963,877 A | 10/1999 | Kobayashi | |
| 5,995,833 A * | 11/1999 | Zicker | 455/430 |
| 6,038,446 A | 3/2000 | Courtney et al. | |
| 6,052,604 A | 4/2000 | Bishop, Jr. et al. | |
| 6,061,562 A | 5/2000 | Martin et al. | |
| 6,104,926 A | 8/2000 | Hogg et al. | |
| 6,151,308 A | 11/2000 | Ibanez-Meier et al. | |
| 6,167,263 A | 12/2000 | Campbell | |
| 6,249,243 B1 | 6/2001 | Takagi | |
| 6,249,913 B1 | 6/2001 | Galipeau et al. | |

(Continued)

OTHER PUBLICATIONS

Rudokas, Cellular System Performance Prediction, Radio and Wireless Conference (RAWCON), pp. 15-156, Aug. 1998.

(Continued)

*Primary Examiner*—Sharad Rampuria
(74) *Attorney, Agent, or Firm*—Gates & Cooper LLP

(57) ABSTRACT

An apparatus and method for providing an aircraft-based wireless communications service is disclosed. An exemplary system includes a plurality of aircraft each including on-board equipment for supporting wireless communications with one or more dual mode handsets and for exchanging wireless communication traffic and control information. One or more ground stations communicate with the plurality of commercial aircraft using feeder communications links exchanging the wireless communication traffic and control information and providing interfaces with a terrestrial telecommunications infrastructure. A control center manages the one or more ground stations and the on-board equipment of the commercial aircraft and dynamically assigns resources to the on-board equipment of the plurality of aircraft using an overlapped set of coverage patterns.

22 Claims, 12 Drawing Sheets

U.S. PATENT DOCUMENTS

| | | | |
|---|---|---|---|
| 6,285,878 B1 | 9/2001 | Lai | |
| 6,314,286 B1 * | 11/2001 | Zicker | 455/431 |
| 6,317,420 B1 * | 11/2001 | Schiff | 370/325 |
| 6,317,583 B1 * | 11/2001 | Wolcott et al. | 455/12.1 |
| 6,321,084 B1 * | 11/2001 | Horrer | 455/431 |
| 6,324,398 B1 | 11/2001 | Lanzerotti et al. | |
| 6,393,281 B1 | 5/2002 | Capone et al. | |
| 6,408,180 B1 * | 6/2002 | McKenna et al. | 455/431 |
| 6,511,020 B2 * | 1/2003 | Higgins | 455/12.1 |
| 6,580,921 B1 * | 6/2003 | Inoue et al. | 455/552.1 |
| 6,603,967 B1 | 8/2003 | Sinivaara et al. | |
| 6,642,894 B1 * | 11/2003 | Gross et al. | 343/705 |
| 6,704,543 B1 * | 3/2004 | Sharon et al. | 455/12.1 |
| 6,751,458 B1 * | 6/2004 | Wang et al. | 455/427 |
| 6,756,937 B1 * | 6/2004 | Chang et al. | 342/354 |
| 6,788,935 B1 * | 9/2004 | McKenna et al. | 455/431 |
| 6,795,699 B1 | 9/2004 | McCraw et al. | |
| 6,868,269 B1 * | 3/2005 | Hagen et al. | 455/429 |
| 6,937,857 B2 * | 8/2005 | Karabinis | 455/428 |
| 7,123,905 B1 * | 10/2006 | Allaway et al. | 455/417 |
| 7,369,847 B1 * | 5/2008 | Rosen et al. | 455/429 |
| 2002/0006792 A1 * | 1/2002 | Usher et al. | 455/426 |
| 2002/0016168 A1 | 2/2002 | Roussenu et al. | |
| 2002/0019229 A1 | 2/2002 | Usher et al. | |
| 2004/0147243 A1 | 7/2004 | McKenna | |
| 2004/0253951 A1 | 12/2004 | Chang et al. | |
| 2006/0040660 A1 * | 2/2006 | Cruz et al. | 455/431 |

OTHER PUBLICATIONS

El-Jabu et al., Cellular Communications Using Aerial Platforms, IEEE Transactions on Vehicular Technology, vol. 50, No. 3, pp. 686-700, May 2001.

Rudokas, Capacity Losses in Sector and Microcell Cellular Systems, IEEE Communications Letters, vol. 1, No. 2, Mar. 1997, pp. 43-45.

* cited by examiner

AIRCRAFT BASED CELLULAR SYSTEM

BACKGROUND OF THE INVENTION

1. Field of the Invention

The present invention relates to radio communication systems, and particularly to cellular radio communication system using aircraft.

2. Description of the Related Art

In the United States and elsewhere, domestic cellular telephony coverage is not universally available. Estimates suggest that coverage by terrestrial cellular systems using analog (first generation or 1G) technology now extends to 70% of the co-terminus United States land mass and 95% of the population. Likewise, coverage by terrestrial systems using digital (second generation or 2G/2.5G) technology extends to only 20% of the co-terminus United States land mass but includes 80% of the population.

Within those geographical areas already covered by terrestrial cellular service, vagaries of electromagnetic propagation cause gaps in service with estimates indicating that these gaps are as extensive as 10% to 20% of nominal coverage. As it requires a significant investment, further expansion of the existing terrestrial cellular infrastructure to accommodate the population not presently served is unlikely.

Furthermore, when deployed in terrestrial cellular systems, anticipated third generation (3G) technology will likely cover a co-terminus United States land mass no larger than its immediate 2G/2.5G predecessor. Some authors refer to these shortfalls in terrestrial cellular coverage as the cellular divide or, for generations 2G and beyond, the digital divide.

Prior inventors have brought forth a variety of approaches for providing coverage of mobile telephony users in areas not presently served. Most well known are low earth-orbiting (LEO) satellite-based systems such as Iridium and Globalstar. These systems rely on a constellation of LEO satellites to provide coverage for properly equipped users. The users communicate directly with a satellite, which uses feeder links to relay user traffic to a ground station, or ground stations, for connection with the terrestrial telecommunications infrastructure. Low earth orbiting satellites necessarily provide global or near-global coverage so that the associated investment yields an overall capacity, which greatly exceeds the capacity available for domestic (US) usage at any time.

Also presently in service are several geosynchronous (GEO) satellite-based systems, e.g. MSV, Thuraya and ACeS. These systems place a dedicated satellite (or satellites) above the geographic region to be covered so that their entire capacity is available to properly equipped users therein. Users again communicate directly with the satellite, which relays traffic to a ground station using feeder links.

For either LEO or GEO satellite-based systems, some user equipment also operates with selected terrestrial cellular systems. However, not all user equipment supports dual mode operation, e.g., MSV offers only dedicated single mode user equipment.

Alternate satellite-based systems are also possible. For example, U.S. Pat. No. 5,722,042, which is incorporated by reference herein, advocates a satellite communications system with a double-layered earth-orbiting constellation with a lower first orbit altitude and a higher second orbit altitude. None of these alternate systems appears to have entered service.

Regardless of their orbital characteristics, satellite-based systems opt to impose a fixed set of cells on the earth's surface. This approach forces non-stationary satellites to adjust their antennas to track a coverage area as they move along their orbits and to rapidly switch their antennas between coverage areas periodically to support a new coverage area on the earth's surface. Supporting such fixed patterns simplifies user operation but complicates antenna design and increases satellite cost.

High costs associated with rocket launches make satellite-based systems very expensive to deploy. Moreover, high usage costs and bulky, expensive user terminals limit adoption of deployed satellite-based systems by potential subscribers. Several of these systems have gone through bankruptcy whereas others only recently entered service with financial results still indeterminate.

Other systems for providing coverage of domestic mobile telephony users in unserved areas include a variety of elevated platforms, including an interesting dual use of National Weather Service balloons.

U.S. Pat. No. 3,742,358, which is incorporated by reference herein, and other patents cited therein illustrate the distant origins of knowledge of extensive coverage associated with elevated platforms, e.g., airborne platforms. Subsequently, U.S. Pat. Nos. 4,704,732 and 5,104,059, which are both incorporated by reference herein, identify communications as one application of freely suspended, long endurance high altitude platforms. U.S. Pat. Nos. 4,476,576 and 4,903,036, which are both incorporated by reference herein, employ a tethered aerostat specifically as an antenna to support VLF communications.

U.S. Pat. Nos. 5,949,766 and 6,151,308, which are both incorporated by reference herein, describe ground devices and an elevated wireless communications hub capable of switching, i.e., separating signals from multiple sources and sending them to multiple destinations. U.S. Pat. No. 5,963,877, which is incorporated by reference herein, extends this concept to high altitude platforms that employ antennas capable of creating a cell structure on the earth's surface to support wireless communications including cellular telephony. U.S. Pat. No. 6,061,562, which is incorporated by reference herein, further extends this concept to include a dedicated aircraft flying above the service region while U.S. Pat. No. 6,167,263, also incorporated by reference herein, uses a plurality of dedicated aerial platforms or vehicles, capable of communicating with each other, to provide a global communications network. Finally, U.S. Pat. No. 6,324,398, which is incorporated by reference herein, explicitly emulates the terrestrial cellular infrastructure with ground-based switching centers supporting base stations located on a plurality of dedicated airborne platforms.

All of the foregoing systems strive to keep their elevated platforms stationary over a fixed geographic area to support a fixed service area or set of fixed service areas. In line with this objective, powered elevated platforms rely on tracking antennas much like low earth orbiting satellites but they do not utilize handover of coverage areas as these satellites do.

At present, none of these systems related to elevated, but non-orbiting, platforms has entered operational service. As revenue that they generate must cover all operating costs, nationwide deployment of a cellular-type system comprising dedicated elevated platforms appears unlikely. As intended applications, systems based on elevated platforms most often describe either supplemental cellular coverage in regions with heavily utilized terrestrial cellular infrastructures or prime coverage in heavily populated areas with limited or no terrestrial cellular infrastructure. They do not discuss sparsely populated regions because operation therein does not admit recovery of said platform's operating costs.

Commercial aircraft offer another set of elevated platforms that can provide wireless communications to remote terrestrial users. Since these platforms are airborne and, hence, positioned to offer wireless communications services, for the primary purpose of transporting passengers or freight, wireless communications services must defray only a minor part of an commercial aircraft's operating cost. In addition, commercial aircraft pass over remote areas even though they fly between population centers. With more than 1500 commercial aircraft simultaneously airborne for more than sixteen hours daily, domestic coverage provided by this fleet is extensive.

A few years ago, many commercial airlines began offering airborne (on-board) telephone services by implementing telephone units at specific locations within the cabin of the commercial aircraft, typically placed in seatbacks. This service used UHF frequency bands to link outbound calls (from passengers) to ground stations but, due to high usage costs, never achieved financial success. Such services invariably do not support inbound calls because ground-based callers encounter prohibitive difficulties in identifying a ground station within transmission range of a particular aircraft. Because of disappointing financial results, some airlines are now removing this equipment to avoid the cost associated with transporting its weight.

Several subsequent inventions address shortcomings of airborne telephone services. For example, U.S. Pat. No. 5,651,050, which is incorporated by reference herein, describes a method for directing calls of terrestrial origin to an on-board telephone or telephones without knowing aircraft location. The on-board telephones are dedicated to the aircraft but may be temporarily assigned to passengers using traveler identification numbers.

U.S. Pat. No. 6,052,604, which is incorporated by reference herein, extends this calling method to allow passengers to use their own subscriber identity module (SIM) cards as identifiers while sharing on-board telephone resources. This method invokes the system security associated with SIM cards without requiring dedicated telephone units for each passenger who wishes to avail themselves of outbound and/or incoming calling services.

Although Global System for Mobile Communications (GSM) communications equipment employs SIM cards, neither TDMA nor CDMA equipment do. Re-use of passenger equipment offers a powerful incentive to adoption of airborne telephony service, however. Thus, U.S. Pat. No. 6,249,913, which is incorporated by reference herein, describes a method to use passengers' personal terrestrial cellular telephones with docking cradles that disable on-the-air transmissions from these units within the aircraft. Contrariwise, U.S. Pat. No. 6,249,243, which is incorporated by reference herein, describes a method for using low power, on-the-air transmissions to and from passengers' personal cellular telephones within the aircraft.

U.S. Pat. No. 6,393,281, which is incorporated by reference herein, describes a means for seamless handoff of calls as an aircraft passes out of the coverage area of one ground station and into the coverage area of another ground station.

Although focused on providing broadband services to passengers, U.S. Pat. No. 6,285,878, which is incorporated by reference herein, initially recognized the feasibility of extending these airborne services beyond passengers to include terrestrial users located within line-of-sight of the host aircraft. The method described in this patent is more restrictive than that described herein because it relies on crosslinks between commercial aircraft and requires control over aircraft scheduling to ensure availability of platforms for relaying communications traffic.

In addition, crosslink equipment is expensive especially as it requires pointing and supports multiple levels of relay, i.e., communications traffic from multiple aircraft. Airlines set their schedules based on attracting passengers within constraints imposed by their specific gate assignments at particular airports, which may not readily support long strings of aircraft relaying communications traffic as, for instance, those crossing the North Atlantic Ocean.

Although others have observed that commercial aircraft and cellular telephony make a potent combination, none have addressed coverage gaps that inevitably develop in terrestrial cellular patterns hosted by commercial aircraft. See e.g., V. Pandiarajan and L. Joiner, "Undedicated HAAP Based Architecture for Cellular Data Transfers," IEEE Southeastcon, pp. 23-26, 2000, which is incorporated by reference herein. As these aircraft choose their own schedules and flight dynamics while operating in an environment that sometimes disrupts both schedules and/or flight dynamics, using commercial aircraft to offer cost-effective wireless communications services requires techniques described in the present invention.

SUMMARY OF THE INVENTION

The present invention uses commercial aircraft as cellular sites to provide wireless communications for terrestrial users within aircraft field of view and for passengers. The plurality of commercial aircraft in flight at any given time provides extensive geographic coverage including areas currently unserved or underserved by terrestrial cellular systems. Use of dual mode user equipment and moving, overlapping cellular structures admits simple and inexpensive on-board equipment for aircraft.

A typical embodiment of the invention encompasses a system for providing aircraft-based wireless communications service to terrestrial subscribers, especially in areas lacking cellular coverage or in gaps in existing terrestrial-based cellular coverage, and also to passengers on-board these aircraft. The system includes a plurality of commercial aircraft serving as base stations with on-board equipment capable of supporting wireless communications with properly equipped users and of exchanging traffic and control information with ground stations. Ground stations are provided that communicate with the commercial aircraft using feeder communications links to exchange traffic and control information and also to provide interfaces with the terrestrial telecommunications infrastructure. A control center manages ground stations and commercial aircraft serving as base stations and dynamically assigns resources to the aircraft using an overlapped set of coverage patterns. Dual mode handsets are capable of communicating with the aircraft on-board equipment using wireless communications, either internal or external to the aircraft and with standard terrestrial-based cellular service when available.

The wireless communications service can be a cellular-type service where the cellular-type links use standard cellular communications. Furthermore, the wireless communications links can employ cellular standards and technology but operate in frequency bands not allocated to other terrestrial cellular systems. In order to prevent passengers from using terrestrial cellular equipment while in flight, the system can also include a means for on-board jamming of terrestrial cellular bands. Crosslinks can also be employed between commercial aircraft for exchanging user traffic and control information. The ground stations can be collocated with cellular sites and the control center can be either ground-based or satellite-based.

The system can employ overlapped coverage patterns as a set of cellular patterns. These overlapped coverage patterns can be based on a primary aircraft direction of travel. The feeder communications links can operate at microwave or millimeter wave bands, also utilizing cellular-type communications.

It is an object of the present invention to provide wireless communications service for presently unserved or underserved terrestrial users using commercial aircraft as communications base stations. It is a further object of the present invention to provide wireless communications service for passengers on the same commercial aircraft. As detailed hereafter, these and other objects are met by the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
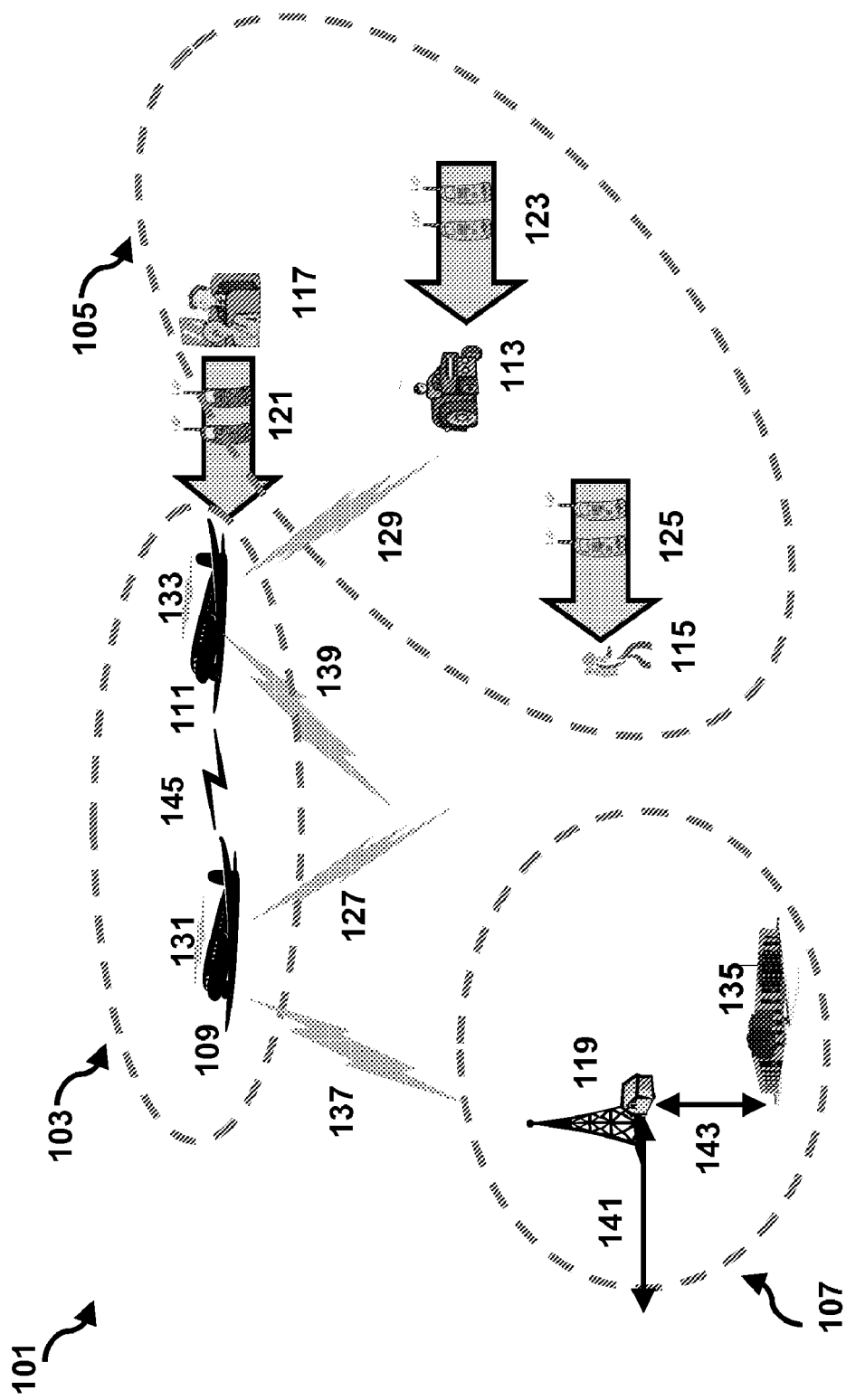
FIG. 1 is a block diagram showing the principal components of a preferred embodiment of the system of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. Overview

There are typically over 3000 commercial aircraft operating over the United States during normal daily operating hours. Operating at altitudes above 30,000 feet, these aircraft have a field of view to earth of over 200 miles, and as a result, these aircraft offer an excellent platform for wireless communications towers that can provide digital wireless communications coverage over most of the United States. In addition, aircraft equipped with wireless communications capability can also provide digital wireless communications services (such as cellular telephony) to onboard passengers.

The system architecture of the present invention utilizes aircraft equipped with base stations that operate as wireless communications towers which form a cellular structure that migrate with the aircraft. Therefore, the cellular frequency re-use pattern "moves" with the aircraft. All aircraft equipped with wireless communications will provide digital communications for the onboard passengers. The onboard wireless communications are routed to the terrestrial telecommunications infrastructure (may be existing) through wireless communication links established with ground stations for backhaul communications. Some of the equipped aircraft are designated to provide service to terrestrial users and are assigned a cellular frequency that migrates with the aircraft. As these aircraft traverse above terrestrial users, the aircraft acts as a base station for the terrestrial user, routing the terrestrial users communications through the aircraft base station to the ground station for backhaul communications.

Those aircraft assigned cellular frequencies form a floating cellular frequency structure that repeats over and over again as selected aircraft are assigned cellular frequencies. The cellular structure not only repeats linearly along the flight path of the selected aircraft but also perpendicularly to these flight paths. This is done to minimize the number of frequencies used and thus maximize the frequency re-use.

By maximizing frequency re-use, a greater number of terrestrial users may be served within an allocated frequency band. In order to optimize frequency re-use, a ground-based control center coordinates the allocation of cellular frequencies assigned to the selected equipped aircraft. The control center ensures that the aircraft assigned a given cellular frequency does not interfere with the cellular frequency assigned to a neighboring aircraft for purposes of servicing terrestrial users.

The control center ensures proper assignments of the moving cellular structure and reassignments of the cellular frequencies from an existing assigned aircraft to another equipped aircraft as may be necessary to ensure the integrity of cellular structure as the aircraft traverse their respective flight path. The system will provide service to user with terminals that are equipped with appropriate functionality to operate with the wireless base stations aboard the equipped aircraft. Users on the ground with terminals implemented with this capability can obtain digital wireless communications services within those landmass areas presently underserved. Aircraft passengers with these terminals can obtain digital wireless communications during flight onboard aircraft equipped with base stations. It is envisioned that these user terminals would also offer standard wireless communications via existing cellular communications infrastructures.

The system architectural approach utilizing current wireless technology described herein offers an economical means of providing digital wireless communications coverage in the range of 90 to 95% of domestic landmass that encompasses a population in the range of 98 to 99%.

2. Exemplary Embodiments

A typical embodiment of the invention includes an implementation based on commercial passenger aircraft, a nationwide grid of ground stations, centralized system control, dual mode user equipment, and a frequency allocation distinct from the standard terrestrial cellular frequency bands. It is recognized that the principles of the present invention apply with other air vehicles or a mix of aircraft and other air vehicles, with distributed system control, with regional ground station grids, with user equipment that supports more than two modes of operation, and with multiple (more than one) frequency allocations distinct from the standard terrestrial cellular bands.

FIG. 1 provides a block diagram for the commercial aircraft-based system 101 comprising three segments (aircraft 103, user 105 and control 107) and the interfaces between these segments. The exemplary system uses commercial aircraft 109, 111 to provide wireless communications for terrestrial users 113, 115 within aircraft field of view and collaterally for on-board users 117 (e.g., passengers). The plurality of domestic commercial aircraft airborne at most times provides extensive geographic coverage including areas currently without service or underserved by terrestrial cellular systems. Thus, these commercial aircraft serve a dual use and are not dedicated only to operation of the system 101.

The aircraft segment 103 includes commercial aircraft 109, 111 serving as base stations with on-board equipment capable of supporting wireless communications with properly equipped users 113, 115, 117 and of exchanging traffic and control information with ground stations 119 using feeder communications. This segment need not include all domestic commercial aircraft, but to provide extensive domestic coverage more aircraft than any single domestic airline currently operates should be employed.

The user segment 105 comprises subscribers (terrestrial 113, 115 or on-board 117) and equipment (dual mode handsets 121, 123, 125 and ancillary equipment such as docking stations, chargers and batteries). User equipment 121, 123, 125 can communicate with aircraft on-board equipment using cellular-type wireless communications either external 127, 129 or internal 131, 133 to the aircraft. Dual mode user equipment 121, 123, 125 can also communicate with standard terrestrial-based cellular service wherever available except on-board a host aircraft in flight where techniques such as low level jamming can be used to preclude use of terrestrial-based cellular service. This service specifically addresses individuals lacking cellular service as potential users. Current cellular subscribers and frequent flyers also present promising candidates.

The control segment 107 includes a grid of one or more ground stations 119 spread across the entire system coverage area (similar to terrestrial cellular base stations) and a control center 135. Ground stations 119 communicate directly with commercial aircraft 109, 111 using feeder communications links 137, 139 to exchange traffic and control information and also to provide backhaul interfaces 141 with the terrestrial telecommunications infrastructure. Collocation of ground stations with existing cellular sites is not mandatory but does offer a ready-made terrestrial infrastructure as these sites experience identical connectivity requirements.

The control center 135 monitors all ground stations 119 and commercial aircraft 109, 111 serving as base stations and assigns resources to them. These assignments are dynamic to accommodate aircraft movement and changes in aircraft schedules, so this control center must periodically convey assignments to aircraft.

Interfaces between the segments include cellular-type links 127, 129 between users and aircraft and feeder links 137, 139 between aircraft and ground stations. To avoid interference, neither of these inter-segment interfaces uses terrestrial cellular operating frequencies. Within segments, terrestrial interfaces 143 exist between ground stations 119 and the control center 135. In further embodiments, crosslinks 145 between aircraft can be used as a natural extension of the present invention.

Figure 2:
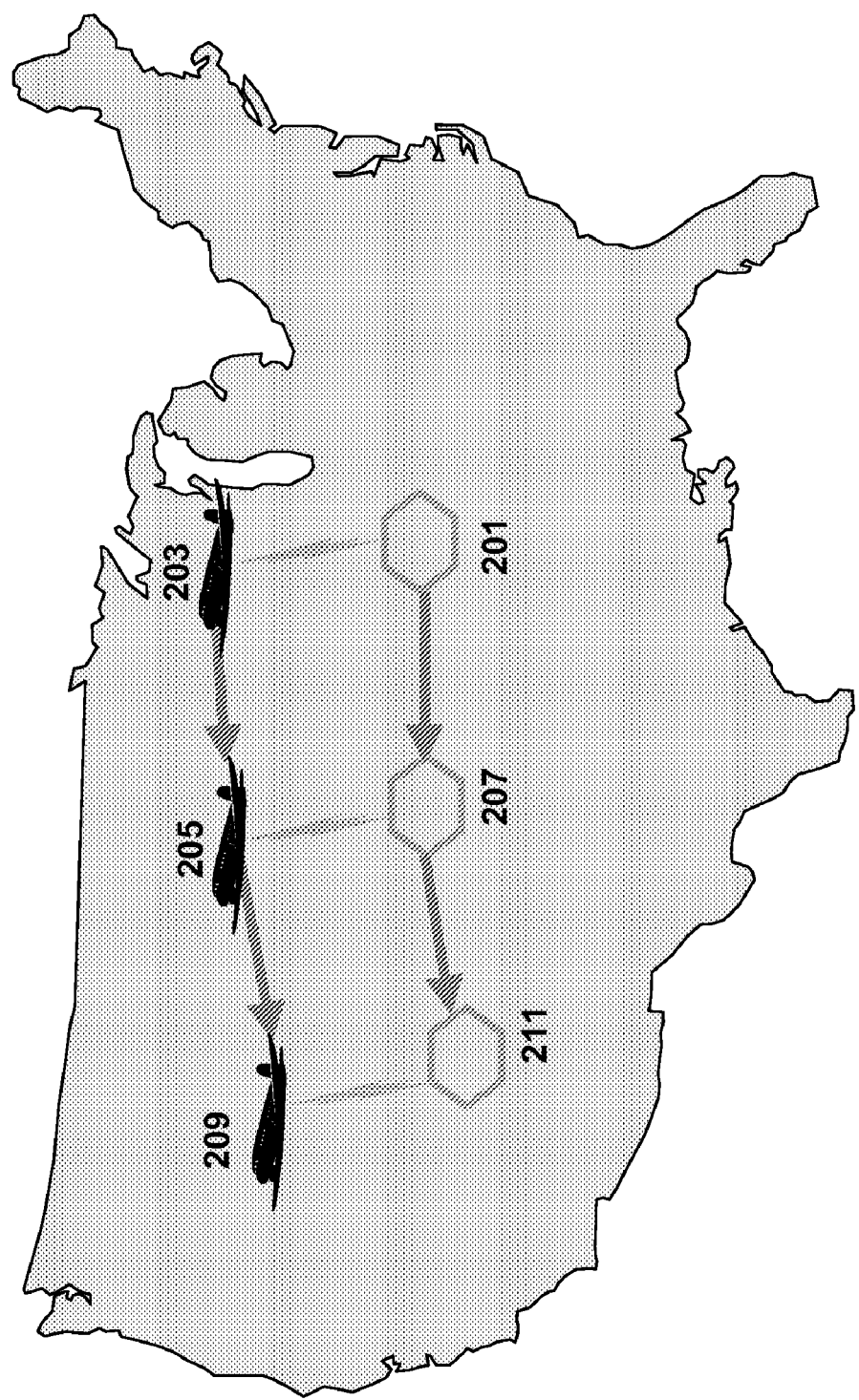
FIG. 2 shows a ground coverage cell for serving terrestrial users as it moves along with its host aircraft during flight.

FIG. 2 shows an exemplary individual coverage cell 201 on the continental U.S. supported by a host aircraft 203 at a particular time. One key to simple aircraft antennas and inexpensive aircraft installations is a cellular pattern comprising coverage cells that move along with their respective host aircraft. As this aircraft continues in flight, its coverage cell moves along with it. Thus, when this aircraft subsequently arrives at position 205, its coverage cell 207 now occupies a different geographical area. Later in its flight, when this aircraft arrives at position 209, its coverage cell 211 now occupies yet another geographical area. Other host aircraft also support coverage cells, which migrate along with their hosts in the same fashion.

Figure 3:
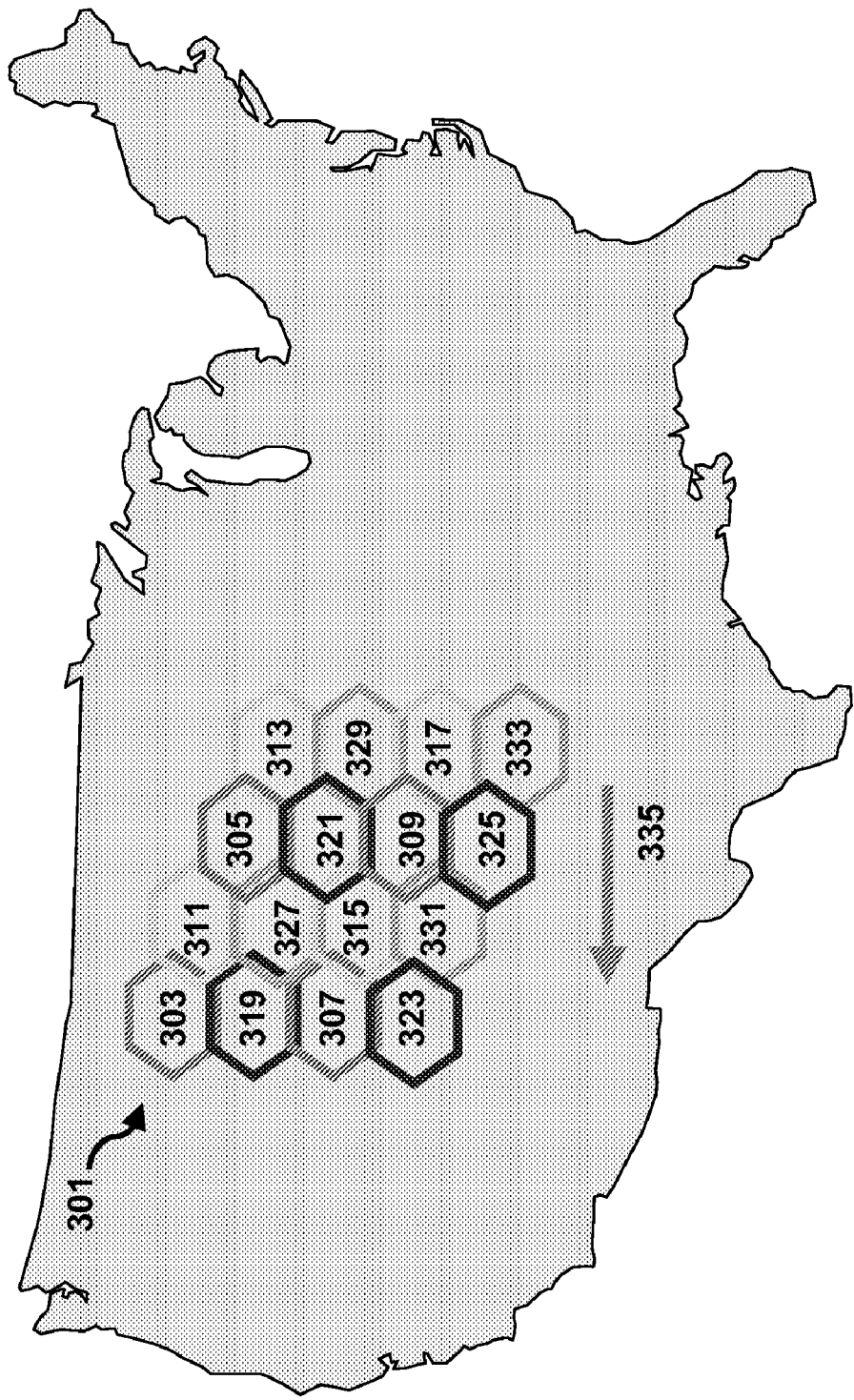
FIG. 3 shows a cellular pattern provided by multiple aircraft where each aircraft supports one coverage cell on the ground.

FIG. 3 shows coverage cells from different host aircraft forming a cellular pattern 301 on the ground. This figure employs a re-use factor of four wherein cells 303, 305, 307 and 309 use a first set of allocated frequencies, cells 311, 313, 315 and 317 use a second set of allocated frequencies, cells 319, 321, 323 and 325 use a third set of allocated frequencies, and cells 327, 329, 331 and 333 use a fourth set of allocated frequencies. Although cellular patterns with a re-use factor of four provide optimal performance for voice applications (e.g., R. Rudokas, "Cellular System Performance Prediction," Radio and Wireless Conference, pp. 153-156, 1998, which is incorporated by reference herein), embodiments of the invention can employ other re-use factors as well.

Coverage cell size is a critical factor in system design. Larger cells require fewer aircraft to provide full domestic coverage, but place more stress on user equipment making these units more expensive. For example, commercial aircraft operating at approximately a 30,000 foot altitude enjoy a line of sight exceeding 200 miles so many choices of cell size are possible. See e.g., B. El-Jabu and R. Steele, "Cellular Communications Using Aerial Platforms," IEEE Transactions on Vehicular Technology, pp. 686-700, May 2001, which is incorporated by reference herein. One embodiment of the present invention compromises by selecting approximately 43 miles as a coverage cell radius. For hexagonal placement of coverage cells, maximum inter-cell overlap is approximately 11.6 miles. Thus, approximately 74.4 miles separates adjacent cell centers in each direction. Each cell covers approximately 5809 ($\pi \times 432$) mi$^2$ of which about 17% is lost to overlaps, yielding an effective coverage area of 4821 mi$^2$ per cell. So, approximately 568 cells of this size can provide complete U.S. domestic coverage.

As each coverage cell moves along the ground with its assigned aircraft, a specified aircraft may keep its allocated frequencies, i.e., its cell intact from point of origin to destination although it may not support ground-based traffic at all times. Providing allocations to aircraft is an important task executed by the control segment, which must ensure that these cells maintain coverage without interfering with one another.

Commercial aircraft have different points of origin and different destinations so coverage cells hosted by different aircraft do not necessarily support a highly structured cellular pattern as familiar from terrestrial cellular systems. Instead they exhibit cellular patterns with dynamic variation especially for aircraft traveling in different directions. As indicated in FIG. 3, if all participating aircraft travel in the same direction 335 (westbound as shown), then the resulting cellular pattern holds its shape for more than the few minutes sufficient to alter a pattern that relies on counter-directional aircraft.

Consequently, to mitigate effects of aircraft schedules and dynamics on cellular re-use patterns, the present invention can separate aircraft into four groups corresponding to their primary directions of travel. Directions selected do not need to correspond to the cardinal directions (northbound, eastbound, southbound and westbound). Employing separate cellular patterns for each group minimizes significant differences in aircraft ground velocity due to the jet stream and their direction of travel thus enabling formation of more stable cellular patterns. Deployment of this system does not require all four of these patterns; even a single directional pattern can provide service. However, coverage improves with each directional pattern added.

Figure 4:
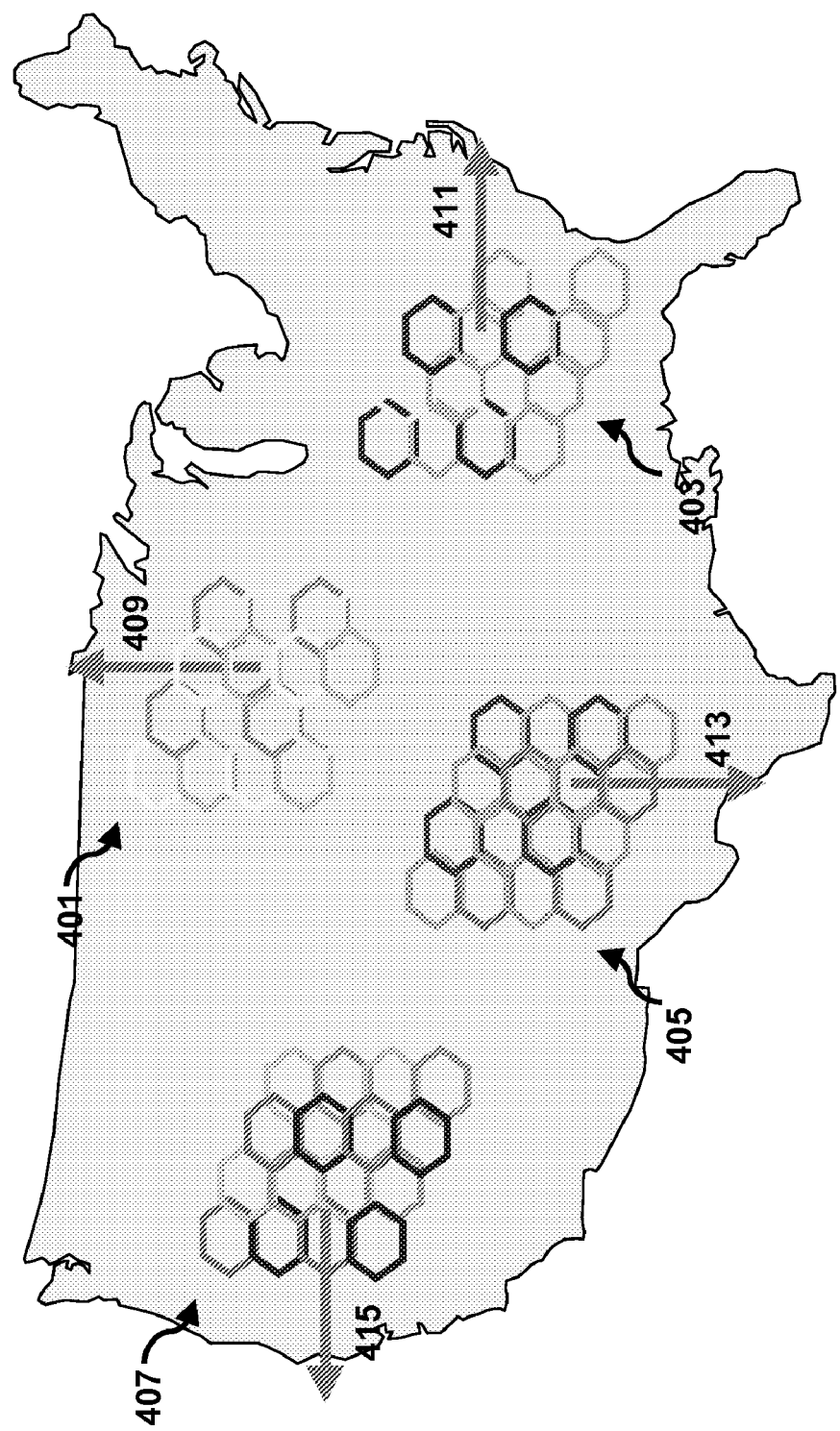
FIG. 4 shows the structure of overlapping northbound, eastbound, southbound and westbound cellular patterns.

FIG. 4 shows a frequency allocation split into four cellular patterns 401, 403, 405, 407 assigned to northbound 409, eastbound 411, southbound 413 and westbound 415 aircraft flows, respectively. As illustrated in FIG. 4, each of these four directional cellular patterns employs a re-use factor of four internally. Other choices of re-use factor are possible and cell patterns assigned to different directions of travel may also choose to employ different re-use factors.

Figure 5:
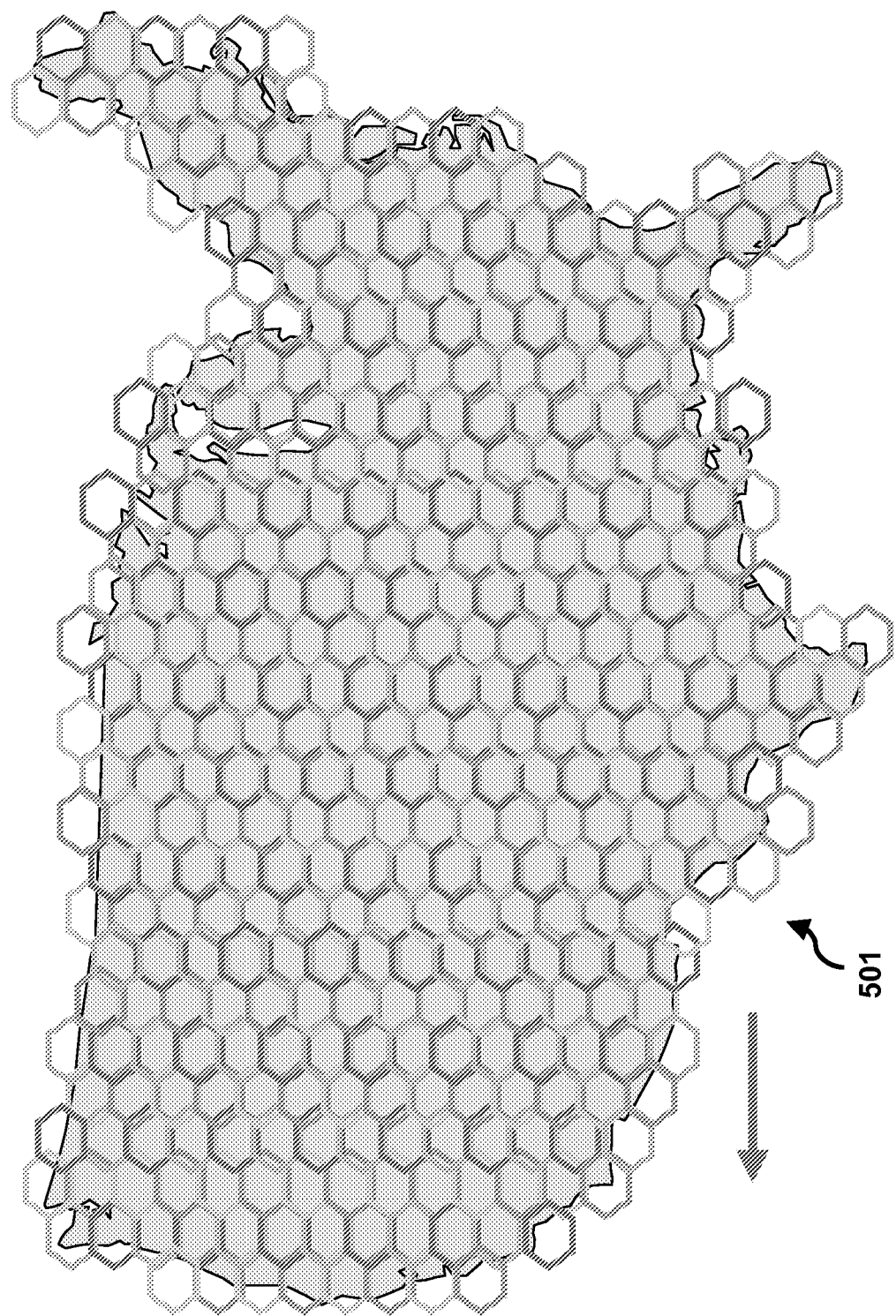
FIG. 5 shows an aircraft-based directional cellular pattern providing domestic coverage.

FIG. 5 shows that as the number of aircraft in flight permits, each directional cellular pattern provides nationwide coverage for the westbound cellular pattern 501. Aircraft movement and schedules cause temporary gaps in coverage in any of these directional cellular patterns. Use of overlapping directional patterns reduces the incidence of coverage gaps and decreases their durations. See e.g., R. Rudokas, "Capacity Losses in Sector and Microcell Cellular Systems," IEEE Communications Letters, pp. 43-45, March 1997, which is incorporated by reference herein.

A typical commercial aircraft is airborne between 9 and 12 hours daily so approximately 1515 (568×(24/9)) equipped aircraft are necessary to provide complete domestic coverage with one cellular pattern around the clock. Allowing a factor of ⅓ for mismatched schedules and aircraft maintenance increases this quantity (1515) to 2020 equipped aircraft out of more than 7000 aircraft in the commercial fleet. For coverage in two or more directions, this number increases although schedule mismatch becomes less important when overlapping coverage is available.

Enough aircraft are in flight to provide nationwide domestic coverage for about 16 hours daily. In most regions, performance is limited between the hours of 1 AM and 5 AM local time when demand is also low. This coincides with usage of terrestrial cellular systems, which experience peak (busy hour) demand for about 4 hours daily but less than 10% of this level for nearly 10 hours daily.

Although directional cellular patterns overlap, transmissions from cells in the companion cellular patterns have no more impact on performance experienced by users in a cell than transmissions from adjacent cells in the same cellular pattern. Thus, deploying overlapping cellular patterns based on direction of travel does not degrade achievable performance.

Figure 6:
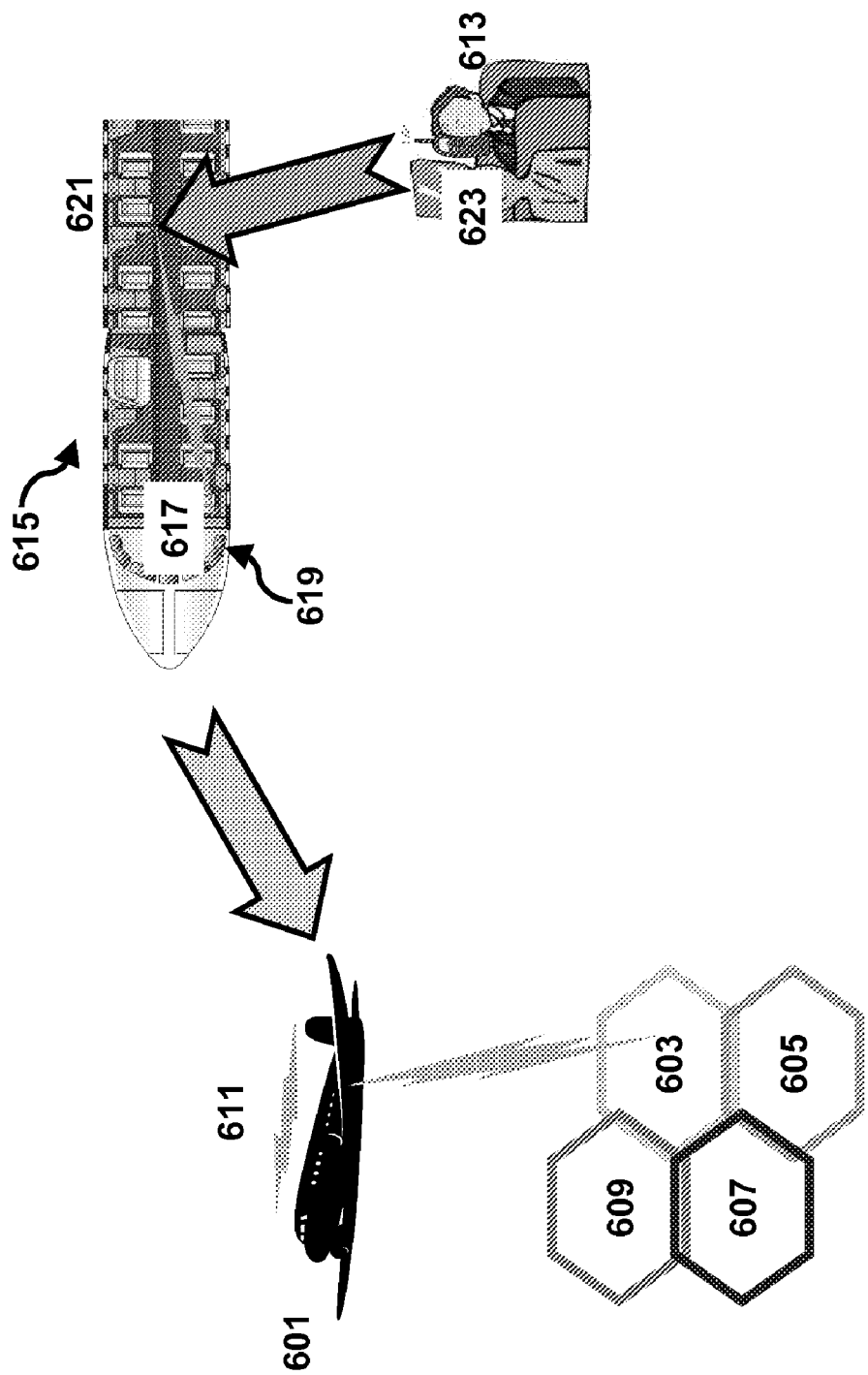
FIG. 6 shows re-use of neighboring or adjacent frequency allocations within an aircraft for passenger services.

FIG. 6 shows re-use of neighboring or adjacent frequency allocations within an aircraft for passenger services. Embodiments of the invention can additionally provide wireless communications for passengers on-board an aircraft having identical user equipment as that which supports terrestrial-based users. As previously described, an exemplary aircraft 601 supports its own external coverage cell 603. As shown in FIG. 6, the aircraft 601 also employs some or all of the frequency allocations assigned to neighboring and overlapping cells 605, 607 and 609 to provide wireless coverage 611 for passengers 613 at low signal levels. This approach avoids mutual interference between this internal on-board usage and external usage in either direction.

Within the aircraft cabin 615 shown from a top view, antennas 617 mounted internal to the cabin link on-board base station equipment 619 with passenger locations 621, enabling passengers 613 to communicate by employing their user equipment 623. As an example, in the coverage depiction of FIG. 6, the frequency allocation from cell 605 is reused in the aircraft cabin. Some commercial aircraft may deploy multiple internal antennas to ensure coverage for all passenger locations.

In further embodiments, aircraft can utilize various techniques such as low level jamming of terrestrial cellular uplink bands to preclude passengers from using their standard (terrestrial-only) cellular user equipment as airline personnel cannot monitor this usage.

Figure 7:
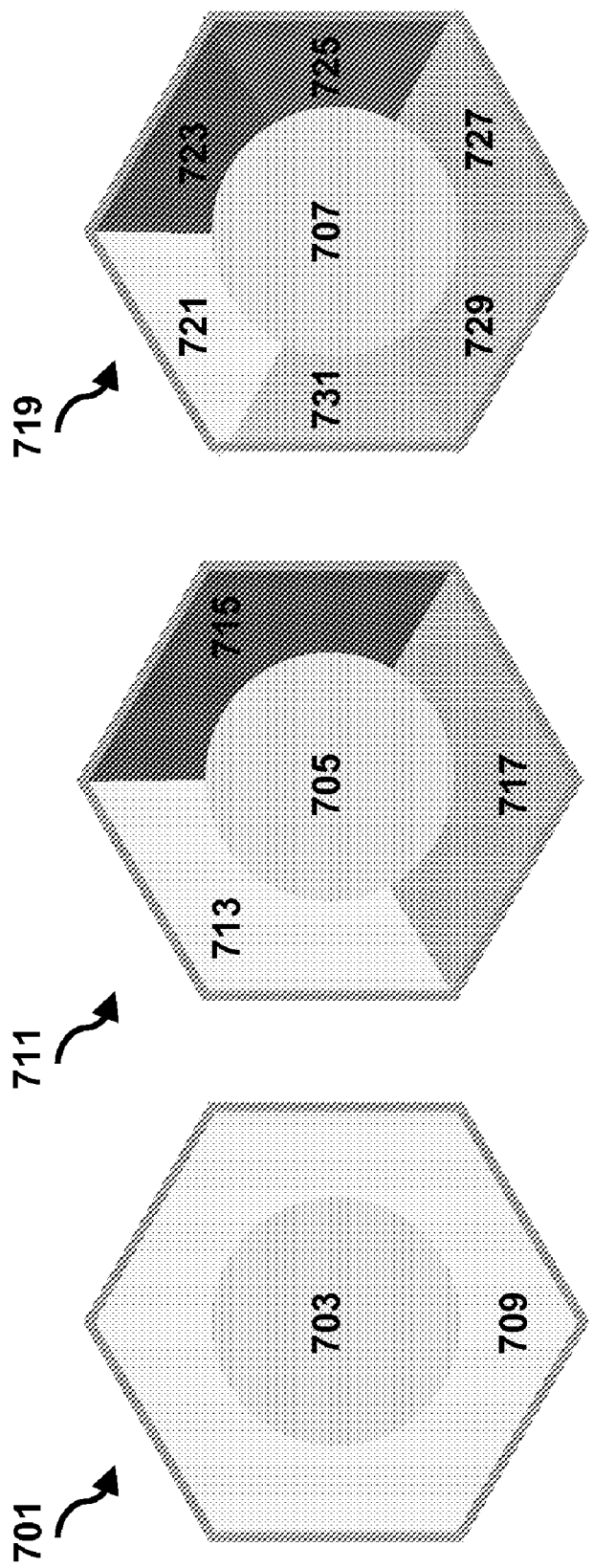
FIG. 7 shows sectorization of each coverage cell into multiple parts including multiple embodiments that use two, four or seven sectors, respectively.

FIG. 7 shows several sectorizations which differ from typical terrestrial sectorization through inclusion of a central sector of circular shape. Sectorization of ground coverage cells provided by commercial aircraft divides the frequency allocation given to a coverage cell among the sectors formed therein. This technique can reduce co-channel interference in the cellular patterns supported by these aircraft. As shown in FIG. 7, for aircraft-based cells 701, several sectorizations are shown which differ from typical terrestrial sectorization through inclusion of a central sector of circular shape 703, 705, 707. Sectorization may divide the annular region into as many sectors as desired and with non-uniform shapes.

The simplest first configuration 701 employs only two sectors to facilitate employment of standard cellular technology by limiting sector size and, hence, user delay times. Despite its shape and overall extent, the surrounding sector 709 also imposes tighter limits on user delay times. The second configuration 711 uses a central sector 705 and three equal area annular sectors 713, 715 and 717 to reduce co-channel interference by approximately 3 dB. The third configuration 719 uses a central sector 707 and six equal area annular sectors 721, 723, 725, 727, 729 and 731 to reduce co-channel interference by approximately 6 dB.

Figure 8:
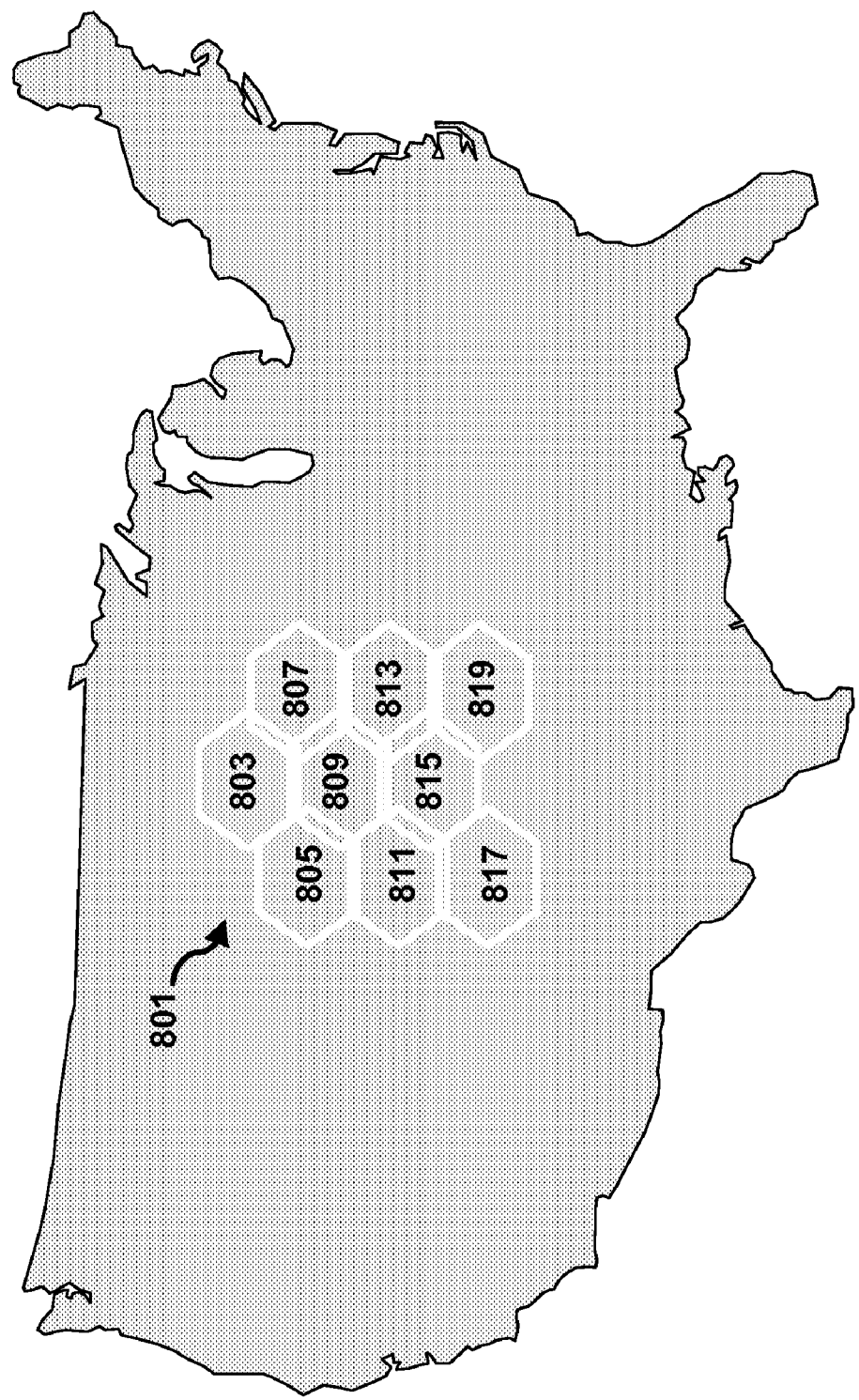
FIG. 8 shows the cellular pattern structure for ground station feeder links between aircraft and ground stations.

FIG. 8 shows the nationwide grid of ground stations 801 that support an exemplary system also set up a cellular pattern to re-use the feeder link frequency allocation. Each feeder link cell 803, 805, 807, 809, 811, 813, 815, 817 and 819 utilizes the entire feeder spectrum allocation. To avoid interference while keeping aircraft antennas and installations simple and inexpensive, each ground station uses high gain antennas to track aircraft while exchanging relatively broadband feeder signals. Tracking antennas minimize interference enough to support a re-use factor of one for the feeder link frequency allocation thereby maximizing system capacity. With an ample frequency allocation, this grid may employ other re-use factors with attendant simplification of equipment.

Cells associated with ground stations enjoy fixed locations so that careful siting of equipment to minimize inter-cell interference or to maximize cell coverage is possible. These cells may employ dimensions similar to those employed with moving aircraft-based coverage cells, especially when available frequency allocation for feeder links is limited, but ground station cells and aircraft-based coverage cells are independent from one another. As long as ground stations provide support for each participating aircraft, no relationship needs to exist between their cells and aircraft-based cells.

Regardless of cell dimensions, cells associated with ground stations do not occupy aircraft coverage cells per se; instead the latter cells sweep past fixed ground station cells as individual aircraft come and go. With as many as four overlapping directional cellular patterns, each ground station supports at least four aircraft simultaneously.

Figure 9:
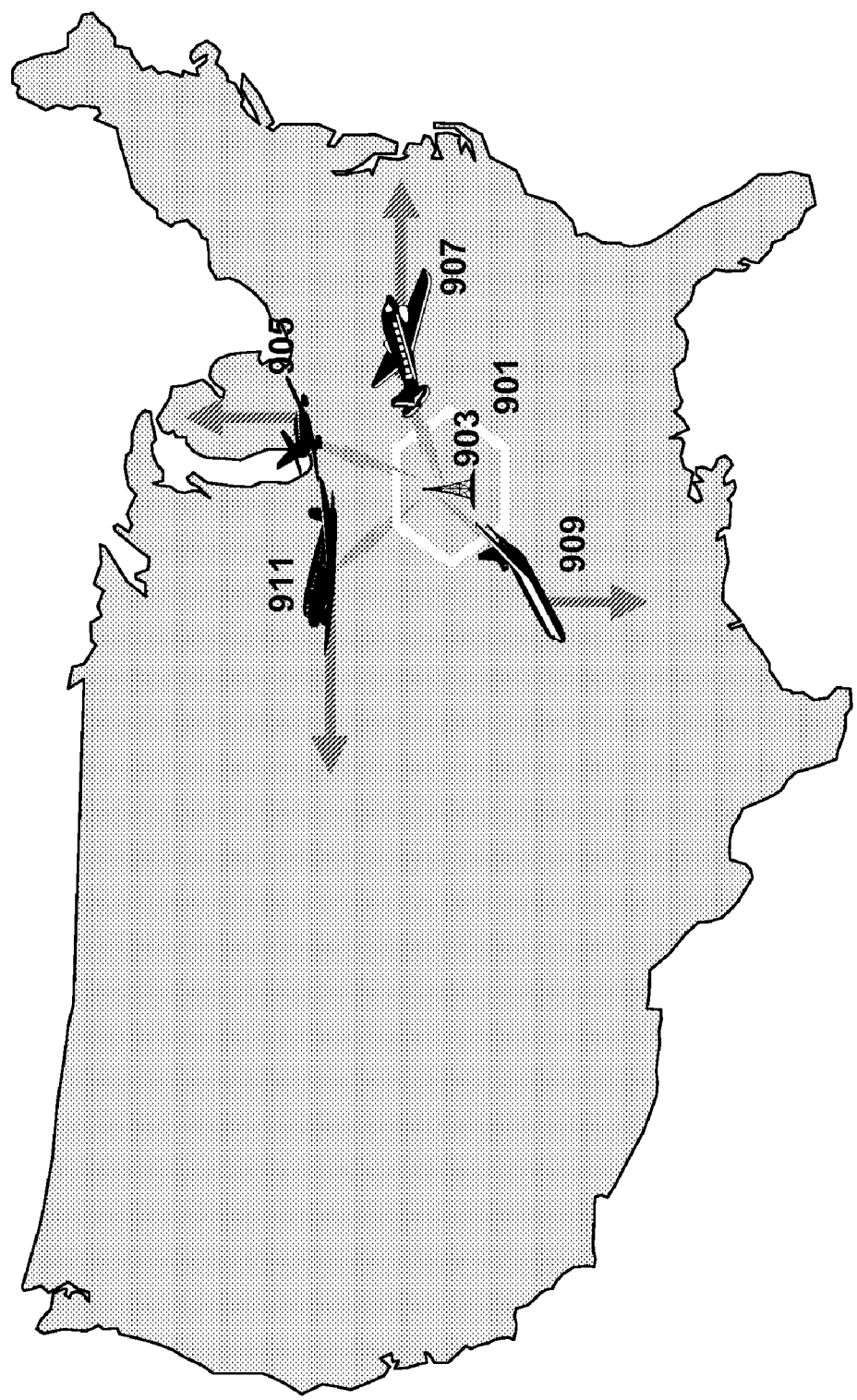
FIG. 9 shows a ground station with feeder links serving four aircraft comprising one aircraft from each of the four aircraft-based directional cellular patterns.

FIG. 9 illustrates support of multiple directional cellular patterns. To support four directional cellular patterns, each ground station cell 901 has sufficient resources 903 to support northbound 905, eastbound 907, southbound 909 and westbound 911 aircraft. As any of these aircraft may cross paths as seen from this ground station, when reporting to the same ground station aircraft traveling in different directions share this feeder link frequency allocation, e.g., each aircraft takes one-quarter of it.

Figure 10:
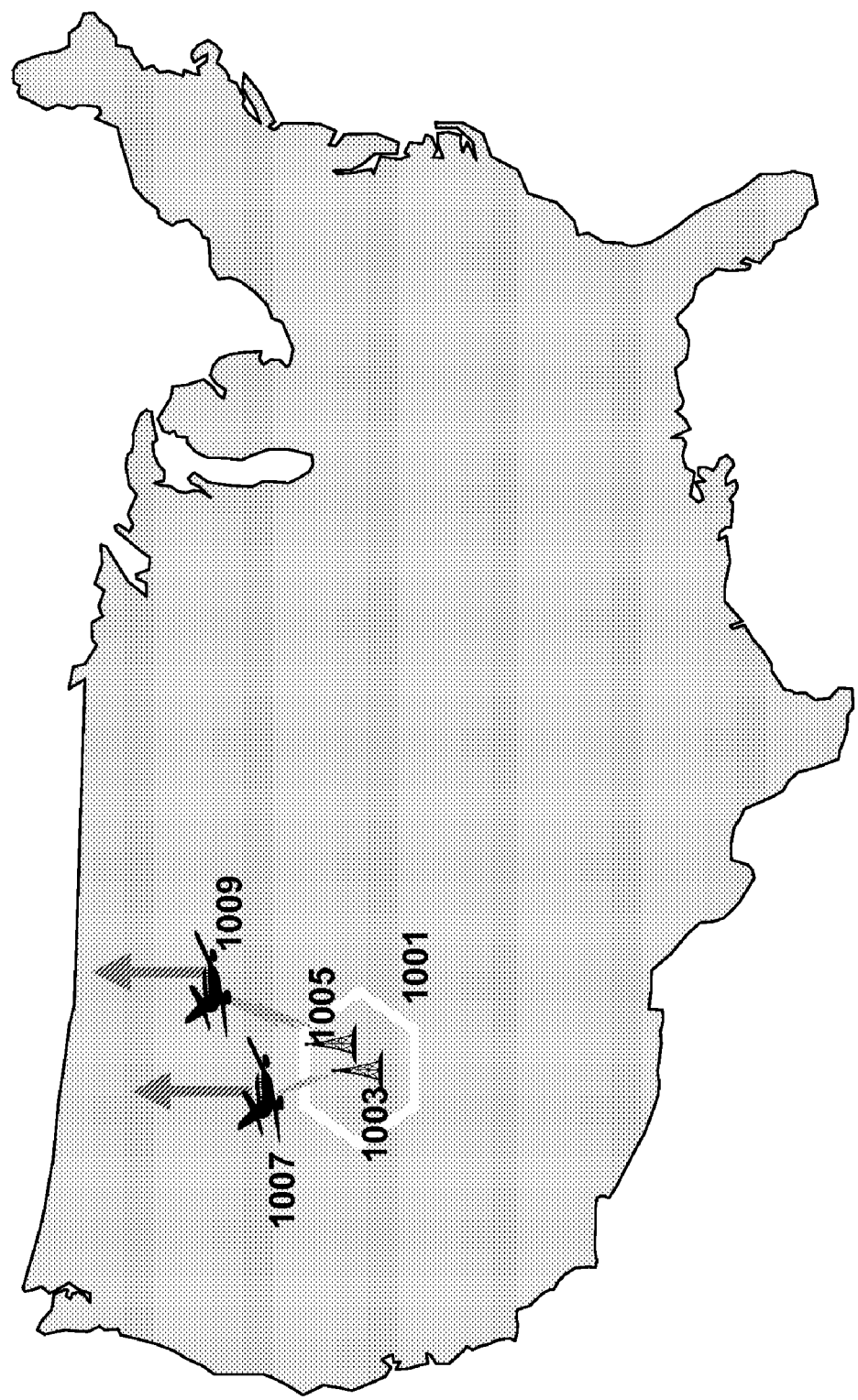
FIG. 10 shows a ground station with feeder links serving two aircraft that share an allocation thereby providing a joint coverage cell.

FIG. 10 illustrates use of high gain tracking antennas at a ground station also allows for partial re-use of any of the four directional frequency allocations within a ground station's coverage area 1001. This segmentation requires more equipment 1003, 1005 at a ground station, but also provides additional capacity by recovering passenger-originated traffic from both aircraft. Thus, multiple (co-directional) aircraft 1007, 1009 can operate within this coverage area provided they share (in any partition from 0%/100% to 100%/0%) the frequency allocation intended for aircraft-based cellular communications. The control center adjusts the overall cellular pattern for this direction to accommodate any distortion in coverage attributable to this resource sharing.

Figure 11:
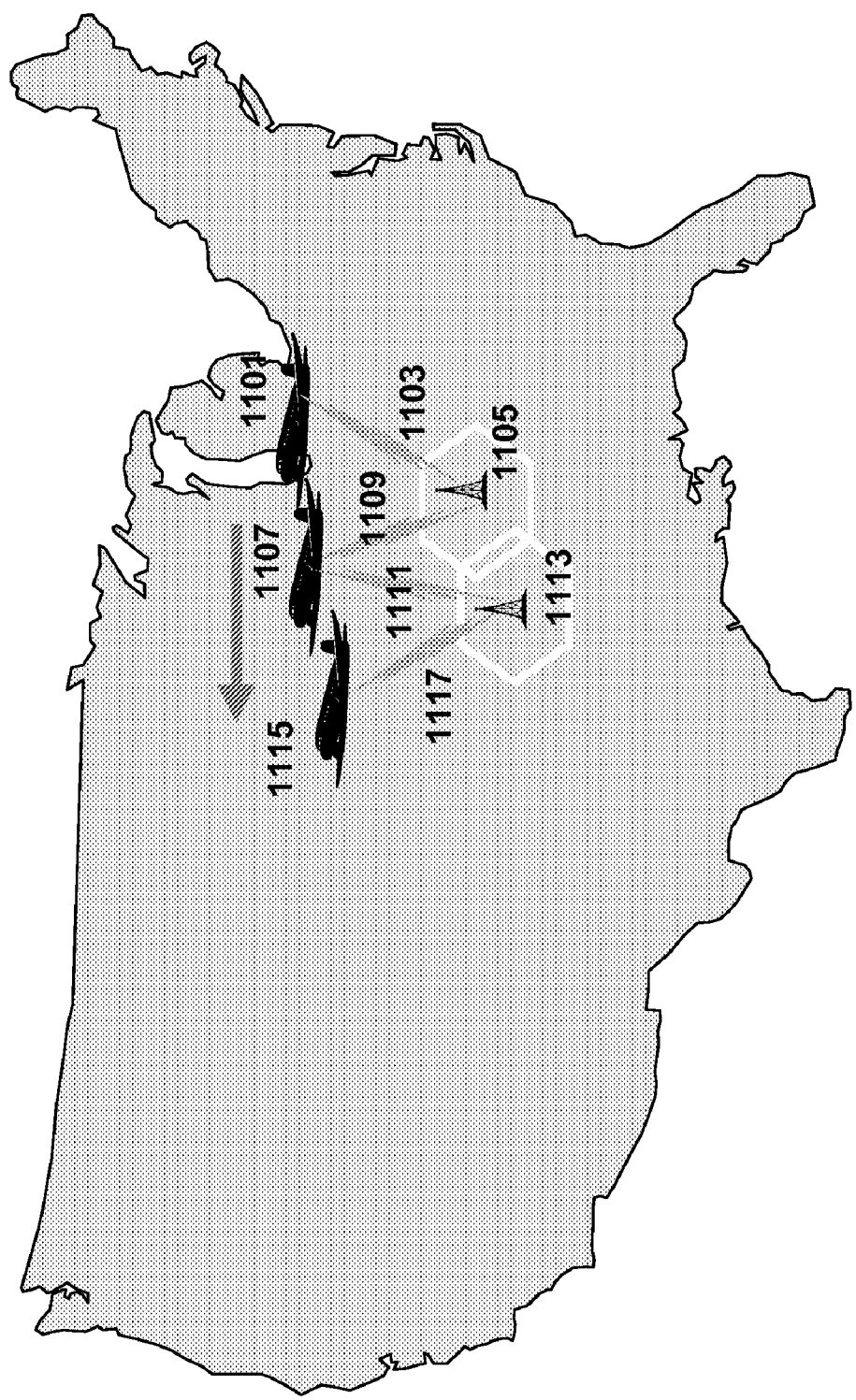
FIG. 11 shows an aircraft switching its feeder link between two ground stations.

FIG. 11 illustrates handover traffic and control information from one ground station to another to maintain connectivity for users as individual aircraft fly along. An aircraft 1101 using feeder link 1103 to communicate with ground station 1105. As this aircraft reaches position 1107 and begins to exit the coverage provided by ground station 1105, it continues to communicate with this ground station using feeder link 1109 but also simultaneously establishes a feeder link 1111 with ground station 1113. With feeder link 1111 operational, the aircraft 1107 switches traffic to feeder link 1111 and discontinues feeder link 1109. As the aircraft reaches position 1115, it relies entirely on feeder link 1117 to communicate with ground station 1113.

It should also be noted that as the aircraft moves along and performs maneuvers, e.g. banking, the coverage pattern, the cell locations and size, will modulate. However, adequate margin in the coverage pattern will accommodate this coverage modulation. In addition, the modulation format can have an effect on the optimal coverage pattern. For example, time division multiple access (TDMA) will restrict the allowable cell size as a consequence of the moving cell antenna within the aircraft.

Figure 12:
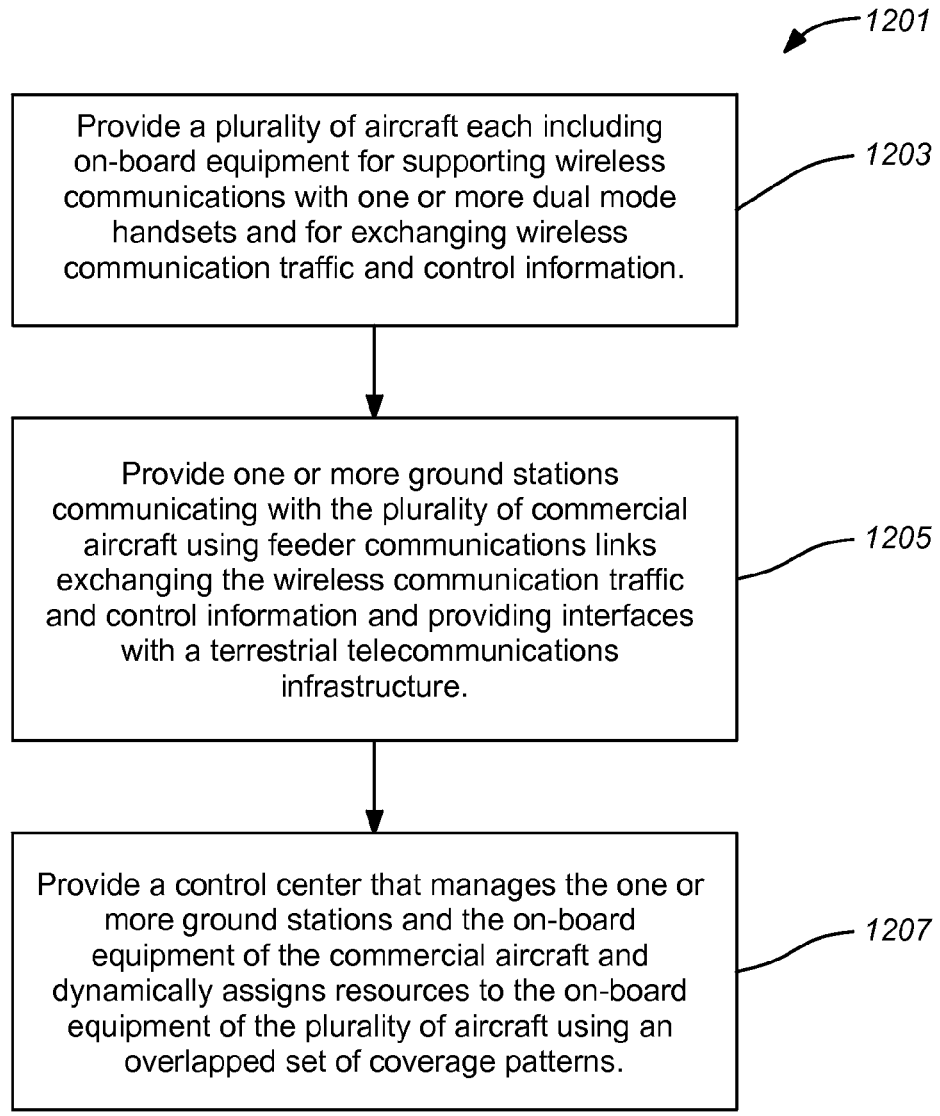
FIG. 12 is a flowchart of an exemplary method of the invention.

FIG. 12 illustrates and exemplary method 1201 of providing aircraft-based wireless communications service. At step 1203, a plurality of aircraft are provided each including on-board equipment for supporting wireless communications with one or more dual mode handsets and for exchanging wireless communication traffic and control information. At step 1205, one or more ground stations are provided communicating with the plurality of commercial aircraft using feeder communications links exchanging the wireless communication traffic and control information and providing interfaces with a terrestrial telecommunications infrastructure. At step 1207, a control center is provided that manages the one or more ground stations and the on-board equipment of the commercial aircraft and dynamically assigns resources to the on-board equipment of the plurality of aircraft using an overlapped set of coverage patterns. The basic method 1201 can be modified consistent with the exemplary system detailed above.

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A system for providing an aircraft-based wireless communications service, comprising:
    a plurality of aircraft, each of the aircraft being used as a cell site and including on-board equipment that acts as a base station for supporting wireless communications both with terrestrial users within the aircraft's field of view and with passengers on-board the aircraft;
    one or more ground stations communicating with the plurality of aircraft using feeder communications links exchanging the wireless communications' traffic and control information and providing interfaces with a terrestrial telecommunications infrastructure; and
    a control center that manages the one or more ground stations and the on-board equipment of the plurality of aircraft and dynamically assigns resources to the on-board equipment of the plurality of aircraft to create an overlapped set of coverage patterns for the terrestrial users.

2. The system of claim 1, wherein the wireless communications service is a cellular-type service.

3. The system of claim 1, wherein the wireless communications operate in frequency bands not allocated to terrestrial cellular systems.

4. The system of claim 1, wherein one or more of the plurality of aircraft each include an on-board jamming system for jamming of terrestrial cellular bands to prevent passengers on board the aircraft from using terrestrial cellular equipment while in flight.

5. The system of claim 1, wherein two or more of the plurality of aircraft each include equipment for crosslinks between the so equipped aircraft for exchanging user traffic and control information.

6. The system of claim 1, wherein the one or more ground stations are collocated with terrestrial cellular sites.

7. The system of claim 1, wherein the control center is ground-based.

8. The system of claim 1, wherein the control center is satellite-based.

9. The system of claim 1, wherein the overlapped set of coverage patterns are based on the aircrafts' direction of travel.

10. A method for providing an aircraft-based wireless communications service, comprising the steps of:
    providing a plurality of aircraft, each of the aircraft being used as a cell site and including on-board equipment that acts as a base station for supporting wireless communications both with terrestrial users within the aircraft's field of view and with passengers on-board the aircraft;
    providing one or more ground stations communicating with the plurality of aircraft using feeder communications links exchanging the wireless communications' traffic and control information and providing interfaces with a terrestrial telecommunications infrastructure; and
    providing a control center that manages the one or more ground stations and the on-board equipment of the plurality of aircraft and dynamically assigns resources to the on-board equipment of the plurality of aircraft to create an overlapped set of coverage patterns for the terrestrial users.

11. The method of claim 10, wherein the wireless communications service is a cellular-type service.

12. The method of claim 10, wherein the wireless communications operate in frequency bands not allocated to terrestrial cellular systems.

13. The method of claim 10, wherein one or more of the plurality of aircraft each include an on-board jamming system for jamming of terrestrial cellular bands to prevent passengers on board the aircraft from using terrestrial cellular equipment while in flight.

14. The method of claim 10, wherein two or more of the plurality of aircraft each include equipment for crosslinks between the so equipped aircraft for exchanging user traffic and control information.

15. The method of claim 10, wherein the one or more ground stations are collocated with terrestrial cellular sites.

16. The method of claim 10, wherein the control center is ground-based.

17. The method of claim 10, wherein the control center is satellite-based.

18. The method of claim 10, wherein the overlapped set of coverage patterns are based on the aircrafts' direction of travel.

19. The system of claim 1, wherein the base stations operate as wireless communications towers.

20. The system of claim 1, wherein a frequency re-use pattern moves with the aircraft.

21. The method of claim 10, wherein the base stations operate as wireless communications towers.

22. The method of claim 10, wherein a frequency re-use pattern moves with the aircraft.

\* \* \* \* \*